(12) United States Patent
Valter

(10) Patent No.: US 7,940,464 B2
(45) Date of Patent: May 10, 2011

(54) OPTICAL SYSTEM AND CORRESPONDING OPTICAL ELEMENT

(75) Inventor: Drazic Valter, Betton (FR)

(73) Assignee: Thomson Licensing, Boulogne-Billancourt (FR)

( * ) Notice: Subject to any disclaimer, the term of this patent is extended or adjusted under 35 U.S.C. 154(b) by 615 days.

(21) Appl. No.: 11/791,184

(22) PCT Filed: Nov. 29, 2005

(86) PCT No.: PCT/EP2005/056321
§ 371 (c)(1),
(2), (4) Date: May 17, 2007

(87) PCT Pub. No.: WO2006/058885
PCT Pub. Date: Jun. 8, 2006

(65) Prior Publication Data
US 2007/0297065 A1  Dec. 27, 2007

(30) Foreign Application Priority Data

Dec. 1, 2004  (FR) ...................................... 04 12774
Jun. 13, 2005  (FR) ...................................... 05 51583

(51) Int. Cl.
*G02B 27/30* (2006.01)
*G02B 27/10* (2006.01)
*F21S 8/00* (2006.01)
*G03B 27/54* (2006.01)

(52) U.S. Cl. ........... 359/641; 359/619; 362/268; 355/67

(58) Field of Classification Search .................. 359/641, 359/619, 626, 628; 355/67; 362/268
See application file for complete search history.

(56) References Cited

U.S. PATENT DOCUMENTS

| 5,386,266 A | 1/1995 | Kang |
| 5,995,303 A | 11/1999 | Honguh et al. |
| 2003/0031031 A1 | 2/2003 | Tiao et al. |

FOREIGN PATENT DOCUMENTS

| DE | 9100934 | 5/1991 |
| DE | 10108637 | 9/2001 |
| EP | 0901031 | 3/1999 |

OTHER PUBLICATIONS

Search Report Dated Feb. 24, 2006.

*Primary Examiner* — Jack Dinh
(74) *Attorney, Agent, or Firm* — Robert D. Shedd; Jeffrey M. Navon

(57) ABSTRACT

The invention relates to an optical system comprising:
  at least one source of illumination designed to produce an illuminating beam; and
  at least one imager able to produce an imaging beam when illuminated by the said illuminating beam;
the said system being characterized in that it further comprises:
  collimating means for collimating the said illuminating beam; and
  at least one optical element comprising, on a first surface, means for redirecting part of the said illuminating beam towards the said imager, so as to illuminate the said imager and for adapting the shape of the said beam to suit the said imager.

13 Claims, 14 Drawing Sheets

PRIOR ART

F = 2.65

F = 3.5

F = 3.5

F = 4.5

OPTICAL SYSTEM AND CORRESPONDING OPTICAL ELEMENT

This application claims the benefit, under 35 U.S.C. §365 of International Application PCT/EP2005/056321, filed Nov. 29, 2005, which was published in accordance with PCT Article 21(2) on Jun. 8, 2006 in English and which claims the benefit of French patent applications No 0412774 filed Dec. 1, 2004 and No 0551583 filed Jun. 13, 2005.

1. FIELD OF THE INVENTION

The invention relates to the field of image projection.

More specifically, the invention relates to an illumination system for an imager in a video projector of the front-projection or back-projection type.

2. TECHNICAL BACKGROUND

According to the technical background, as illustrated with reference to FIG. 1, use is made of an illumination system 10 illuminating an imager 11.

Conventionally, the illumination system 10 comprises:
a source of illumination 100 with elliptical reflector;
a colour wheel 107;
a rectangular light guide 102; and
a system of several relay lenses 104 to 106.

The source of illumination 100 illuminates with a light beam 101 the colour wheel 107 placed at the entry to the rectangular light guide 102 at the focal point of the elliptical reflector of the source 100. The rectangular light guide 102 is used to convert the circular cross section of the illuminating beam into a rectangular cross section and to make the beam spatially uniform.

The exit of the light guide 102 is imaged on the imager 11 via the system of relay lenses, of which there are at least two, but of which there are often three or four, the illumination also being preferably telecentric.

If the imager 11 is of the DMD (Digital Micromirrors Device) type marketed by Texas Instruments®), a TIR prism 12 is placed between the illumination system 10 and the imager 11 in order to split the beams. The TIR prism 12 is not needed if the imager 11 is of the transmissive LCD (Liquid Crystal Display) type or is replaced by a PBS (Polarizing Beam Splitter) if the imager 11 is of the LCOS (Liquid Crystal On Silicon) type.

The main disadvantages with the technical background are the number of optical components (typically a guide and at least two relay lenses) and the numerical apertures needed to achieve good performance in terms of efficiency (from f/2.5 to f/3.0), imposing draconian conditions on a projection lens, particularly in its configuration as a shallow-depth projector.

3. SUMMARY OF THE INVENTION

It is an object of the invention to alleviate these disadvantages of the technical background.

More specifically, an objective of the invention is to reduce the number of optical components needed in an image projector.

To this end, the invention proposes an optical system comprising:
at least one source of illumination designed to produce an illuminating beam focused on a focusing zone; and
at least one imager able to produce an imaging beam when illuminated by the illuminating beam;

the system being notable in that it further comprises:
collimating means for collimating the illuminating beam originating from the focusing zone; and
at least one optical element comprising, on a first surface, means for redirecting part of the illuminating beam towards the imager, so as to illuminate the imager and for adapting the shape of the beam to suit the imager.

Advantageously, the collimating means collimate the illuminating beam in such a way that the optical beam diverges from its optical axis by a value of less than 6° in absolute terms.

According to a particular feature, the first surface refracts the illuminating beam.

According to another feature, the collimating means comprise at least one lens separate from the optical element.

According to a preferred feature, the optical element comprises a second surface, opposite to the first surface, the second surface at least partially forming the collimating means.

Advantageously, the second surface is spherical or aspherical.

According to a particular feature, the first surface reflects the illuminating beam.

Preferably, the first surface converts the illuminating beam into a beam of more or less rectangular cross section, the imager being rectangular.

Preferably, the first surface comprises facets, each of the facets being able to redirect part of the illuminating beam towards the imager, thereby forming a redirected beam for illuminating the imager, the redirected beams associated with all of the facets having an overall shape adapted to suit the imager.

Advantageously each of the facets is plane.

Preferably, each of the facets is rectangular or square.

According to an advantageous feature, the optical system comprises a colour wheel and means for focusing the illuminating beam on the colour wheel at the focusing point, the collimating means having, as their focal point, the focusing point.

Advantageously, the system comprises a projection lens for projecting the imaging beam and, possibly, means for folding the imaging beam and a back-projection screen.

According to another preferred feature, the first surface comprises at least one continuous surface designed to redirect at least part of the illuminating beam towards the imager, thereby forming a redirected beam so as to illuminate the imager, the redirected beams associated with the entirety of the first surface having an overall shape adapted to suit the imager.

Advantageously, the continuous surface or each of the continuous surfaces is ridgeless.

According to a particular feature, the continuous surface or surfaces obey an equation belonging to the group comprising:
polynomial equations;
trigonometric equations;
splines; and
combinations of polynomial equations, trigonometric equations and/or splines.

According to particular features, the first surface has no plane facets and/or the first surface is ridgeless.

Advantageously, the first surface comprises:
at least a first zone comprising at least one continuous surface designed to redirect at least part of the illuminating beam towards the imager, thereby forming a redirected beam so as to illuminate the imager, the redirected beams associated with the entirety of the first surface having an overall shape adapted to suit the imager; and at least a second zone comprising facets, each of the facets being able to redirect part of the illuminating beam towards the imager thereby forming a redirected beam so as to illuminate the imager, the redirected beams associated with all of the facets having an overall shape adapted to suit the imager.

Preferably, the surface area of the first surface is less than or equal to 16 cm².

According to an advantageous feature, the aperture of the illuminating beam leaving the optical element is between 3.2 and 5.

According to a preferred feature, the optical element is configured and positioned in such a way that at least 95% of the illuminating flux illuminating the optical element re-emerges via the first surface.

According to a particular feature, the system comprises a colour wheel and means for focusing the illuminating beam on the colour wheel in the focusing zone, the collimating means having, as their focal point, a point lying within the focusing zone.

According to an advantageous feature, the system comprises a projection lens for projecting the imaging beam and/or means for folding the imaging beam and a back-projection screen.

The invention also relates to an optical element for a video projector illumination system, comprising a first surface, notable in that the first surface is designed to redirect an incident illuminating beam in such a way that the beams redirected by the first surface have an overall shape that is more or less rectangular in a given plane.

According to an advantageous feature, the first surface comprises facets and/or a continuous surface which are designed to redirect the incident illuminating beam in such a way that the redirected beams have an overall shape that is more or less rectangular in a given plane.

According to a particular feature, the first surface is refractive.

According to an advantageous variant, the system comprises a second surface opposite to the first surface, this surface being more or less plane or comprising collimating means more or less collimating an illuminating beam originating from a point or from a zone in the form of an isolated spot.

According to another feature, the first surface is reflective.

Advantageously, the first surface comprises collimations means adapted to collimate incident illuminating beam

4. LIST OF FIGURES

The invention will be better understood and other particulars and advantages will become apparent from reading the description which will follow, the description making reference to the attached drawings among which:

Figure 1:
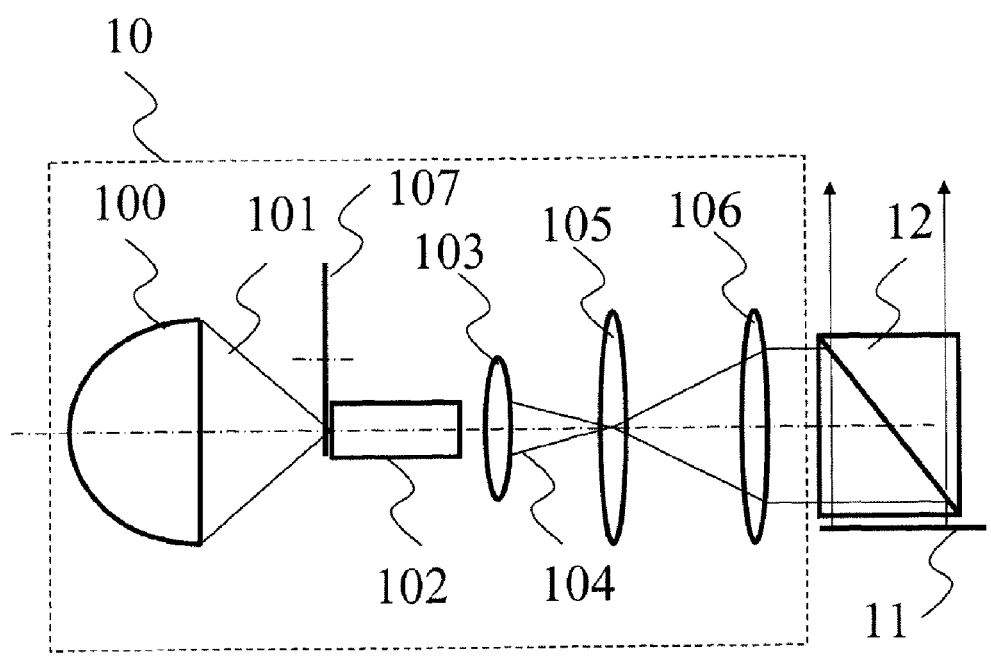
FIG. 1 illustrates an illumination system known per se.
Figure 2:
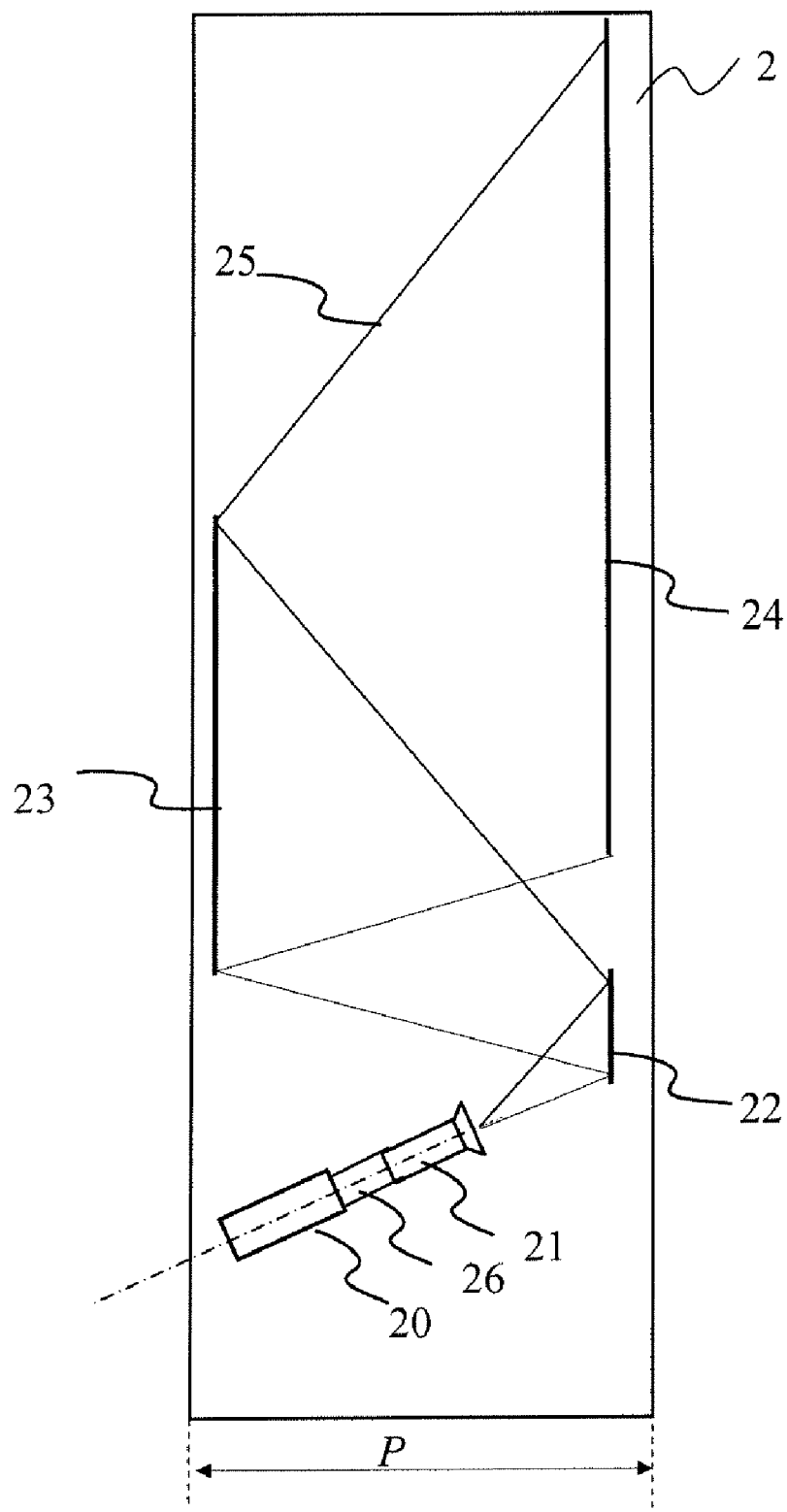
FIG. 2 is a very schematic block diagram of a back-projector according to one embodiment of the invention.
Figure 3:
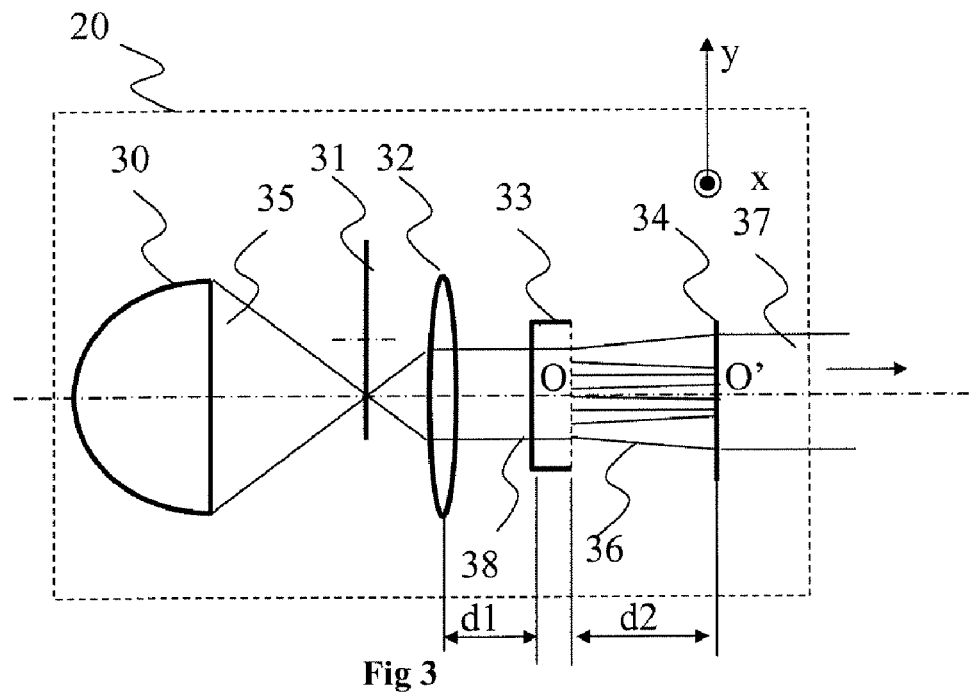
Figure 4:
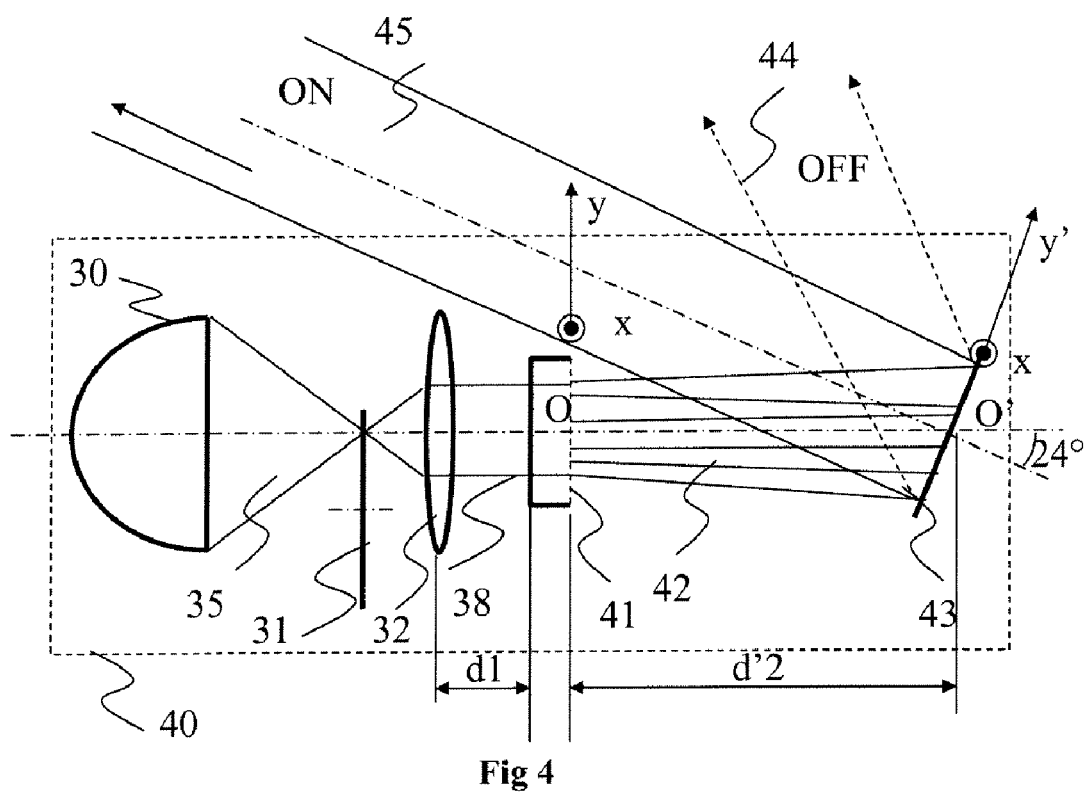
Figure 5:
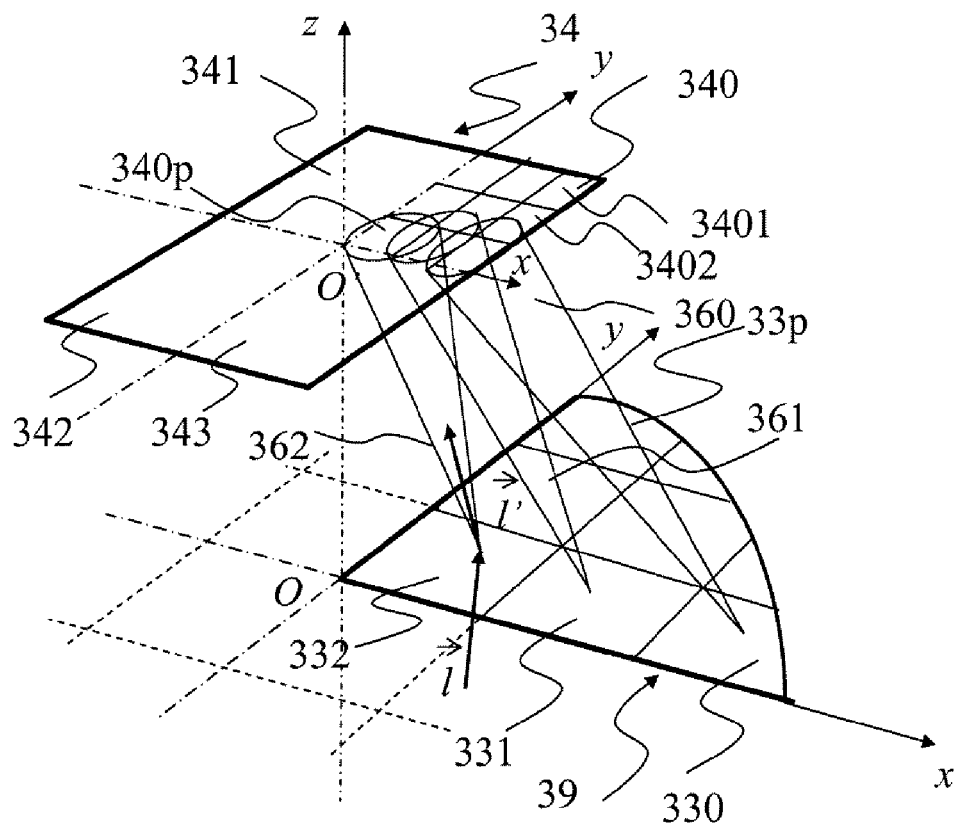
Figure 6:
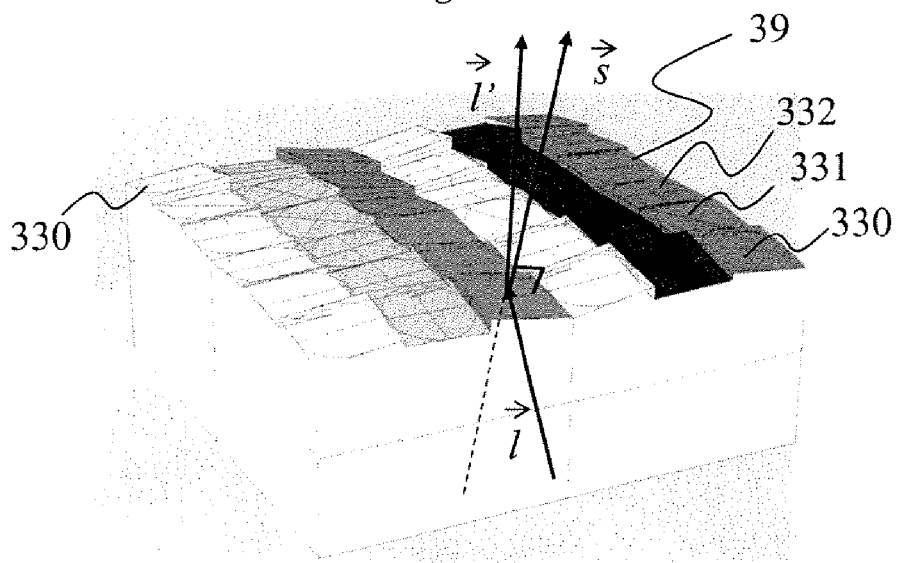
Figure 7:
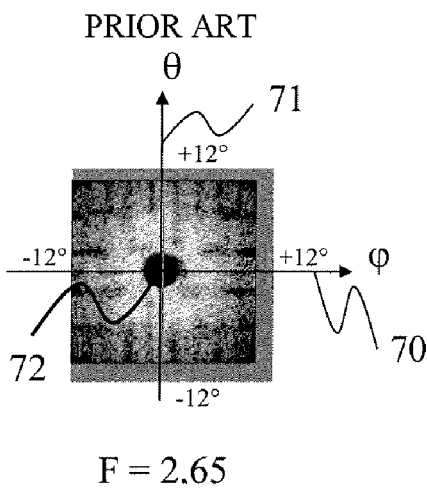
Figure 8:
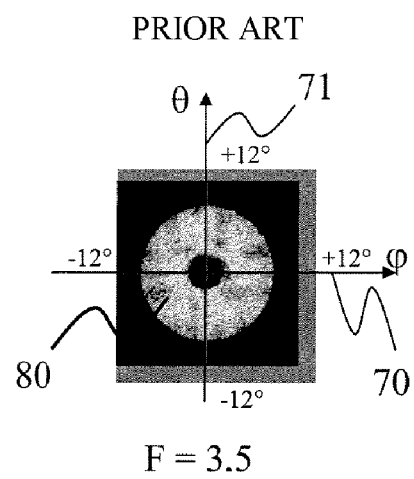
Figure 9:
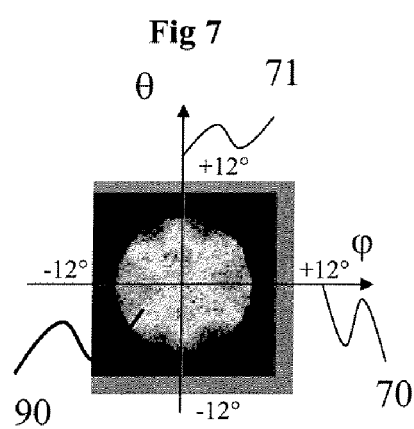
Figure 10:
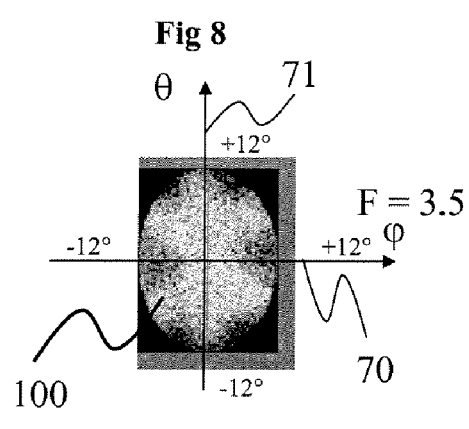
Figure 12:
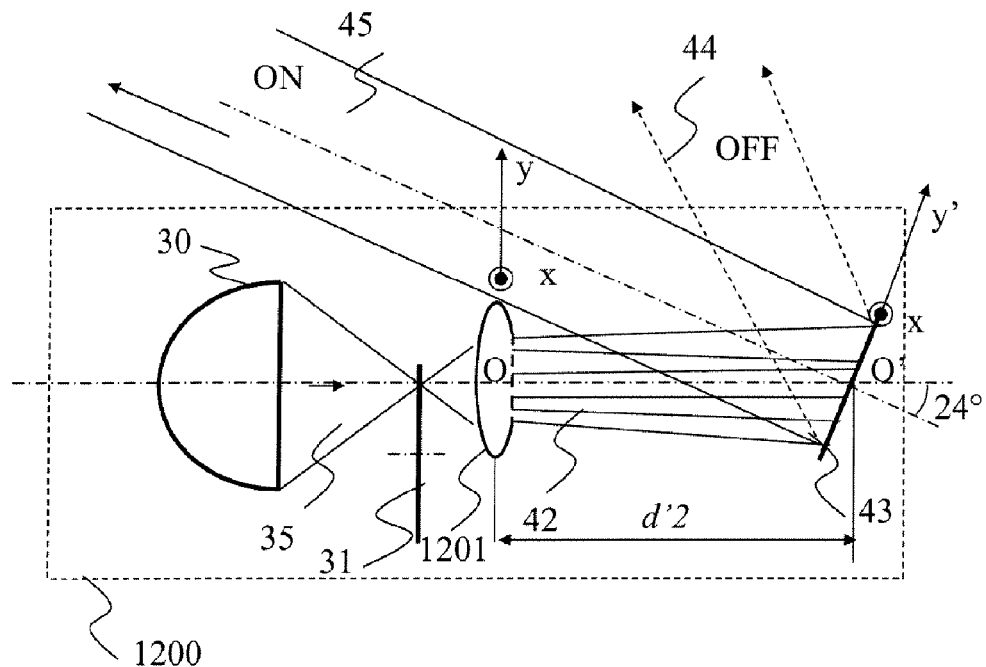
Figure 15:
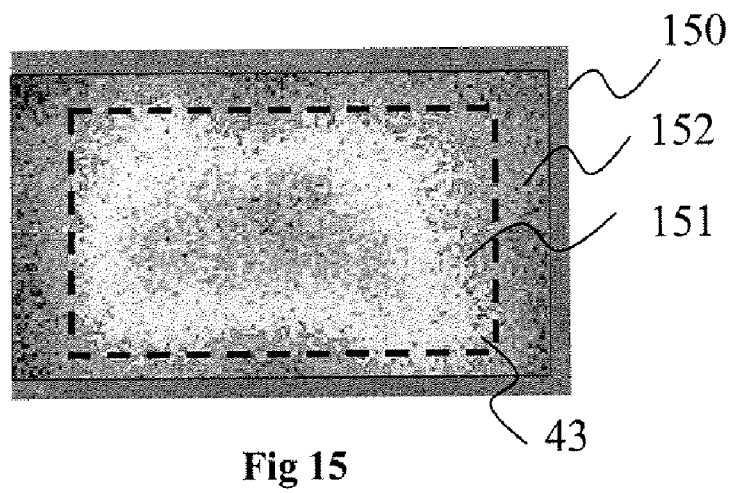
Figure 16:
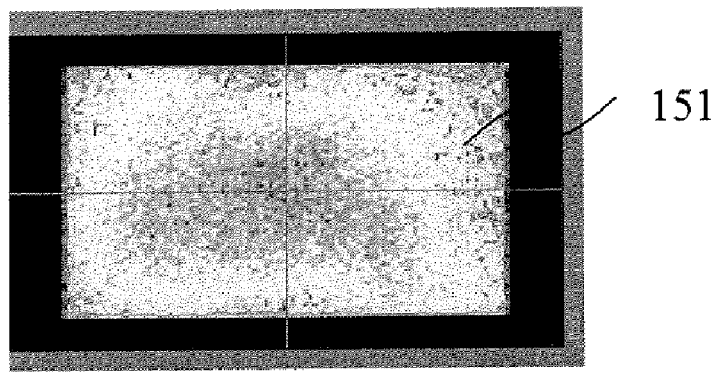
Figure 17:
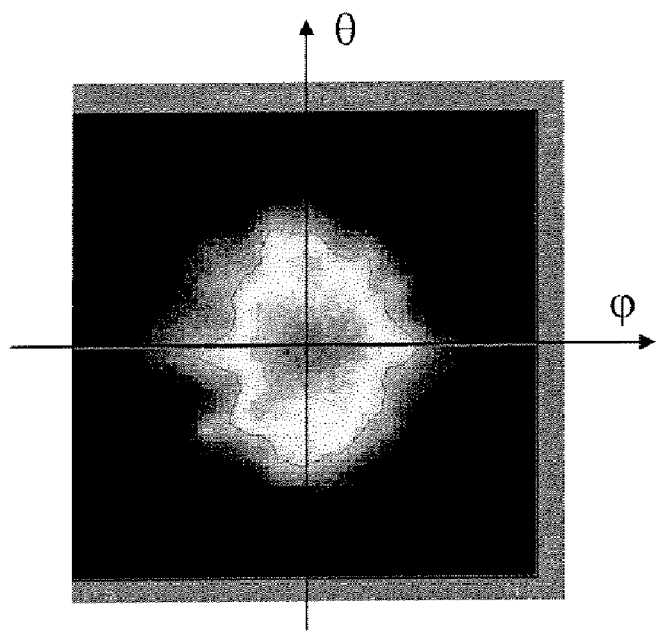

FIG. 3 presents an illumination system employed in the back-projector of FIG. 2;

FIG. 4 illustrates an illumination system according to a variant embodiment of the invention;

FIGS. 5 and 6 present details of the illumination systems of FIGS. 3 and 4;

FIGS. 7 and 8 describe the angular distributions of the light beam on the imager of the system of FIG. 1 known per se;

FIGS. 9 and 10 illustrate angular distributions of the light beam on the imager of the system of FIG. 2 according to the invention;

FIGS. 11 to 14 describe an illumination system and a corresponding lens according to a variant embodiment of the invention;

FIGS. 15 and 16 illustrate patterns of illumination on the imager of the illumination system of FIG. 12;

FIG. 17 presents the angular distribution of the light beams incident upon the imager of the illumination system of FIG. 12;

FIGS. 18 to 25 illustrate illumination systems according to variant embodiments of the invention; and FIGS. 26 to 32 present lenses with a continuous surface employed in the systems of FIGS. 20 to 25.

5. DETAILED DESCRIPTION OF THE INVENTION

The general principle of the invention therefore relies on the redirection, by reflection or transmission, of an incident illuminating beam originating from a focusing zone using an optical component comprising, on at least one of its surfaces, means for redirecting part of the illuminating beam towards an imager, the optical component being positioned with respect to the focusing zone and configured in such a way as to illuminate the imager and as to adapt the shape of the resulting beam to suit the imager.

Thus, the shape of at least one face of the optical component allows the illuminating beam to be redirected in order to illuminate the imager essentially homogeneously.

According to various embodiments, this or these faces comprise at least one continuous surface (which changes the density or the cross section of the beam according to the shape of the imager) and/or plane facets (which convert the incident beam into a plurality of independent beams (which form the resulting beam)).

The incident illuminating beam, typically of circular or elliptical cross section as it enters the optical component, is converted into a beam of rectangular cross section (in the case of a rectangular imager) which illuminates the imager, the uniformity of the overall illumination of the imager being controllable so that the illumination on a screen onto which the image is projected is itself essentially uniform.

Several embodiments of the invention also have the advantage of employing a very thin optical element that uses few materials and occupies very little space.

A projector employing the invention also has the advantage of being compatible with the use of an elliptical lens with an elliptical aperture in the diaphragm of the objective lens, thus making it possible to enhance the contrast of the projected image without additional losses while at the same time having small pupil dimensions.

FIG. 2 is a very schematic block diagram of a back-projector 2 according to a first embodiment of the invention. The projector 2 comprises:
  an illumination system 20;
  an objective lens 21 receiving an illuminating beam 26 created by the illumination system 20 and producing a beam 25;
  a back-projection screen 24 illuminated by the beam 25; and
  two folding mirrors 22 and 23 folding the beam 25 and allowing the depth P of the projector 2 to be thus reduced.

The objective lens 21, the mirrors 22 and 23 and the screen 24, together with their arrangement are well known to those skilled in the art and will not be detailed further.

FIG. 3 illustrates in detail the illumination system 20 with transmissive imager and which comprises:
- a projection lamp 30 producing an illuminating beam 35;
- a colour wheel 31 intersecting the illuminating beam 35;
- a lens 32 collimating the illuminating beam 35 to produce a more or less collimated beam 38 (a beam here being considered to be more or less collimated if it diverges from its optical axis by no more than plus or minus 6°);
- a refractive optical element 33 comprising facets on one of its surfaces and converting the beam 38 into a plurality of beams 36;
- an imager 34 of the transmissive type (transmissive LCD) more or less perpendicular to the axis of the beams 36, illuminated more or less uniformly by the beams 36 and producing an imaging beam 37.

The facets here are surfaces delimited by one or more ridges.

The projection lamp 30 comprises an elliptical reflector and a light source placed at the first focal point of the elliptical reflector, the elliptical reflector focusing the illuminating beam 35 onto the colour wheel 31 at a focusing point (or zone in the form of an isolated spot) corresponding to its second focal point.

The distance d2 separating the optical element 33 from the centre of the imager 34 is a parameter used to optimize the performance of the system (flux, uniformity and/or aperture) according to the degree of collimation of the beam 38 (dependent on the size of the arc of the lamp 30 and of the lens 32), the size of the imager 34, the aperture of an objective lens positioned after the imager 34, and the orientation of the facets on the optical element 33. For example, for an imager 34 measuring 0"55 across the diagonal, d'2 can be chosen to be equal to 80 mm, d'2 preferably being between 50 mm and 110 mm.

The plane of the imager 34 defines two perpendicular axes O'x and O'y, O' being the central point of the imager 34 and each of the axes O'x and O'y being perpendicular to one of the sides of the imager 34. Likewise, the central point of the surface of the optical element 33 comprising the facets is denoted O (O and O' are placed along the optical axis of the optical system) and it is thus possible to define an axis Ox parallel to O'x and an axis Oy parallel to O'y.

According to a more complex variant of the invention, an LCOS system associated with a PBS or a DMD associated with a TIR prism is used.

FIG. 4 illustrates in detail an illumination system 40 according to a variant of the invention.

The elements common to the illumination systems 20 and 40 (particularly the lamp 30, the wheel 31, the lens 32) bear the same references and will not be described further.

The illumination system 40 further comprises:
- an optical element 41 converting the beam 38 into a plurality of beams 42;
- an imager 43 of the reflective (DMD) type appreciably inclined with respect to the axis of the beams 36 by an angle close to 24°, illuminated more or less uniformly by the beams 36 and producing an imaging beam 45 (which does not intersect the optical element 41 or the lens 32) and an unwanted beam 44 corresponding to the beams 42 reflected by the imager 43 in respect of points that lie in a validated or in an invalidated position, respectively.

The distance d'1 separating the lens 32 from the optical element 41 is preferably as short as possible. According to one variant of the invention, the distance d'1 is zero.

The distance d'2 separating the optical element 41 from the centre of the imager 43 is a parameter that can be used to optimize the performance of the system (flux, uniformity and/or aperture) according to the degree of collimation of the beam 38 (dependent on the size of the arc of the lamp 30 and of the lens 32), the size of the imager 43, the aperture of an objective lens positioned after the imager 43 and the orientation of the facets of the optical element 41. For example, for an imager 43 measuring 0"55 across the diagonal, d'2 can be chosen to be equal to 80 mm, d'2 preferably being between 50 mm and 110 mm.

The plane of the imager 43 defines two perpendicular axes O'x and O'y', O' being the central point of the imager 43 and each of the axes O'x and O'y' being perpendicular to one of the sides of the imager 43. Likewise, the central point of the surface of the optical element 41 comprising the facets is denoted O (O and O' are positioned on the optical axis of the optical system) and it is thus possible to define an axis Ox parallel to O'x and an axis Oy perpendicular to the optical axis and to Ox.

According to a more complex variant of the invention, an LCOS associated with a PBS or a DMD associated with a TIR prism is used.

The optical element 33 (or 41) comprises a plane surface perpendicular to the illuminating beam 38 and an opposite surface 39, the surface 39 preferably being on the illuminating beam exit side. A portion of this surface 39 is illustrated in FIG. 6 and comprises a part made up of facets 330 to 33n each designed to redirect part of the illuminating beams 38 towards the imager 34 (or 43) so as to illuminate the imager 34 (or 43) more or less uniformly. Preferably, the facets are square. The number of facets is preferably greater than or equal to 12 and less than or equal to 64 (the higher the number of facets, the better the uniformity can be, but, by contrast, the more losses there will be where the facets meet). A good compromise is, for example, an optical element with 36 facets. Each of the facets is specially designed so that all of the facets together produce an illumination in the shape of the imager (that is to say rectangular) more or less concentrated on the imager, uniform and of small aperture. The optical element 33 (or 41) can be cast in B270 glass in a single operation for both of its faces.

The surface 39 comprising the facets is considered to be the useful surface, the optical element 33 preferably being positioned with respect to the focusing zone and to the source of illumination and configured in such a way that at least 95% of the illuminating flux illuminating the optical element re-emerges via the surface 39.

The projection lamp 30 is, for example, a short arc lamp (for example the Phoenix® lamp, rated at 150 watts and with a 1.0 mm arc). For a given model of lamp, it is possible to predict very accurately the spatial and angular distribution of the rays in the plane of the imager, where the facets of the surface 39 are calculated.

The distance d1 separating the lens 32 from the optical element 33 is preferably as short as possible. According to a variant of the invention, the distance d1 is zero.

The distance d2 separating the optical element 33 from the centre of the imager 34 is a parameter that can be used to optimize the performance of the system (flux, uniformity and/or aperture) according to the degree of collimation of the beam 38 (dependent on the size of the arc of the lamp 30 and of the lens 32), the size of the imager 43, the aperture of an objective lens positioned after the imager 34 and the orientation of the facets of the optical element 33. For example, for an imager 34 measuring 0"55 across the diagonal, d2 can be chosen to be equal to 80 mm, d2 preferably being between 50 mm and 110 mm.

In the context of the use of an imager perpendicular to the beam illuminating it (imager 34), to make the calculations simpler it may be assumed that the surface portion 39 comprising the facets has four quadrants symmetric in pairs with respect to the axes Ox and Oy. Likewise, it is possible to define on the imager four quadrants 340 to 343 that are symmetric in pairs with respect to the axes O'x and O'y. Thus, as illustrated in FIG. 5, each of the four quadrants of the surface 39 is preferably associated with a quadrant 340 to 343 of the imager 34 positioned facing it (that is to say in the same volume bounded by the planes xOz and yOz (or xO'z and yO'z) (the directions Oz and O'z representing the direction of the optical axis) so as to limit the overall aperture of the illuminating and imaging beams. Each of the facets 330 to 33$p$ in the first quadrant of the surface 39 refracts part of the incident beam, directing it towards one of the zones 3401 to 340$p$ of the first quadrant 340 of the imager 34.

More specifically, the quadrant 340 is broken down into p (equal to a product r·m) segments 3401 to 340$p$ and, in respect of each of the sectors 3401 to 340$p$, a facet of the first quadrant of the surface 39 is associated with a sector of the quadrant 340 through a predetermined function, preferably a bijective function (for example defining r rows and m columns in the first quadrant of the surface 39 and of the imager 34, then successively associating the rows (or columns) of the surface 39 with the rows (or columns) of the imager, or alternatively doing so completely randomly).

Next, the mean angle of a beam 36 leaving the centre of a facet and the point of impact of which corresponds to the centre of the associated sector is calculated. The inclination of the facet that refracts the incident beam 38 in an exit direction corresponding to the calculated mean angle is then calculated.

This yields p facets, each having a normal calculated using vectorial refraction equations:

$$\vec{l}'=n\vec{l}+J\vec{s}$$ (J representing the refraction function)

where:
the incident and exit rays correspond to the vectors l and l' respectively;
n is the refractive index of the material of the element 33 (for example glass or transparent plastic);
s represents the normal to the surface of the facet; and
the value of J being equal to $$J = \vec{l}'\vec{s} - n\vec{l}\vec{s}$$

with $s = \begin{pmatrix} x \\ y \\ z \end{pmatrix}; l = \begin{pmatrix} u \\ v \\ w \end{pmatrix}$ and $l' = \begin{pmatrix} u' \\ v' \\ w' \end{pmatrix}$ then, if we set $a = (u' - nu), b = (v' - nv), c = (w' - nw)$ then the normal s to the surface that we are looking for can be expressed as:

$$\vec{s} = \begin{pmatrix} \frac{a}{\sqrt{a^2+b^2+c^2}} \\ \frac{b}{\sqrt{a^2+b^2+c^2}} \\ \frac{c}{\sqrt{a^2+b^2+c^2}} \end{pmatrix}$$

This process is applied in turn in respect of each of the facets, allowing all the orientations to be obtained.

When all the rays in the four quadrants are plotted, the imager 34 is illuminated more or less uniformly. It is then possible to evaluate the total flux (as a percentage of the total flux emitted by the lamp), the illumination uniformity as a percentage of the maximum illumination, and the aperture number for which 90% of the flux is captured by the pupil. Each system is characterized by the three parameters φ (optical power or flux on the imager 34), f (the aperture number for the beams 36 and 37) and u (the uniformity of the illumination on the imager 34 corresponding to the ratio of the minimum illumination to the maximum illumination) and a merit value can be defined for each system, this being given by: $M=\phi\sqrt{u-v}f^2$ for desired minimum uniformity, denoted v, M needing to be as large as possible. The value of v is, for example, equal to 20%.

Other merit values can be used according to variants. Thus, to favour uniformity it is possible to use the following merit formula: $M=\phi(u-v)f^2$ To reduce the influence of the flux it is also possible to use the following formula:

$$M=\phi\sqrt{u-v}\sqrt{f}.$$

In general, it is possible to use a merit formula of the following form:

$$M=\phi(u-v)^p f^r,$$

where p and r represent integers (for example 1, 2 or 3) or fractions (for example ½), and can be chosen as weighting parameters for weighting the uniformity and the flux respectively.

In general, the merit function is a function of φ, u and f, with greater or lesser weighting with respect to φ, u and f depending on the parameters that are to be favoured.

According to a variant embodiment of the invention, the merit function takes account of the loss of uniformity on the screen generated by the variation in angles of incidence in a thin back-projector or in a projector in which the image is projected onto a nearby screen. The merit function is then calculated, for example, by chopping the optical element into strips in the widest direction of the imager, each strip being allocated a uniformity coefficient specific to it so as to compensate for the variation in uniformity due to the geometry of the optical system on the screen.

In general, the invention makes it possible to obtain any uniformity function: to do that, all that is required is to adapt the merit function to take account of the desired uniformity, the parameter υ (minimum desired uniformity) in the above merit formulae then being dependent upon the point on the imager considered.

The invention also makes it possible to allow for illumination of any shape, particularly trapezoidal, hexagonal, elliptical, etc.

Furthermore, the invention is compatible with off-axis illumination (where the imager is not located along the optical axis of the system), minimizing flux losses and maintaining the desired format.

According to a computerized method of calculating the facets, a great many (typically 10 000) possible illumination systems are preferably defined according to the algorithm that follows and the best is selected: for each facet, a point of impact on the imager for an average ray passing through the centre of the facet is defined at random; the orientation s of each facet is then calculated and all the rays passing through this facet are then plotted. Next, the illuminations are summed and the merit function calculated. The systems can be ranked in order of decreasing figures of merit, the best being adopted (that is to say the ones associated with the highest M value obtained); a high merit figure ensures both good uniformity, high flux and an appropriate aperture number.

The facets of the optical elements 33 or 41 are preferably square or rectangular. According to various variants of the invention, the facets of the optical elements 33 or 41 may be of any form, identical or otherwise. As a preference, the facets are juxtaposed in such a way as to avoid unwanted exit beams. In particular, according to various variants of the invention, the facets are juxtaposed with hexagonal or triangular shapes.

According to one variant embodiment of the invention, the quadrants of the optical element 33 are maintained, the quadrants of the optical element 33 not being symmetric. The facets in each quadrant are then calculated independently in order to optimize the uniformity on the imager 34 (it being possible for the beams associated with one quadrant to spill over onto the next quadrant).

According to the invention, two adjacent facets do not necessarily have a common ridge. According to several embodiments of the invention, the optical element comprises adjacent facets orientated differently, the boundary line between them not being perpendicular to the normal to each of the facets: in this case, the corresponding facets have no common ridge (such facets are, for example, the facets 330 and 331 in FIG. 6). As a preference, in this case the corresponding facets are connected by a surface the size of which is as small as possible so as to limit flux losses.

When an imager not perpendicular to the beam illuminating it (imager 43) is being used, in order to simplify the calculations it is possible to assume that the surface portion of the optical element 41 which comprises the facets has four quadrants separated by the axes Ox and Oy. Likewise, the axes O'x and O'y' define, on the imager 43, four separate quadrants. Thus, each of the four quadrants of the surface of the element 41 is preferably associated with a quadrant of the imager 43 facing it (that is to say in the same volume bounded by the planes xOz and yOz (or xO'z and y'O'z) (the directions Oz and O'z representing the direction of the optical axis) so as to limit the total aperture of the illuminating and imaging beams. The orientation of the facets in the four quadrants could exhibit no particular symmetry, the facets in each quadrant of the optical element 41 preferably being calculated independently in order to optimize the uniformity at the imager 43.

According to variants of the invention, the imager of the DMD type is replaced by an imager of the LCOS type associated with a PBS or an imager of the transmissive LCD type associated with the TIR prism. According to variants of the invention, a field lens is inserted between the faceted optical element and the imager in order to allow the largest possible aperture for the imaging and illuminating beams. According to these variants, the facets of the optical element are calculated to take account of the additional reflections and/or refractions (for example when a field lens is inserted, the orientation of the facet is calculated to take account of the additional double refraction of the inserted lens in respect of the central ray of the facet).

FIGS. 7 and 8 describe angular distributions (obtained by simulation) in two angular directions φ 70 and φ 71 of the light beam on the imager 11 of the system 10 of FIG. 1 known per se. According to FIG. 7 (or 8), the distribution depicted is not spatially limited (or is limited by the footprint of the beam on the imager 11, respectively) with an aperture of 2.65 (or 3.5). The presence of a dark spot 72 at the centre which corresponds to an absence of illumination at the source is noted. The illumination system is not being used in this case to its full capability.

FIG. 7 shows a loss of light. What happens is that, on leaving the light guide 102, there is an angle of ±30°. The lenses 103 to 106 are able to reduce this angle, reducing it to ±12° while at the same time maintaining the magnification. None the less, the etendue (that is to say the exit area of the light guide multiplied by the solid angle of the emitted light) is degraded.

Such a system requires the use of an objective lens with an aperture of between 2.4 and 2.8 for a DMD of size HD3S (a diagonal measuring 0"55), which is relatively high and entails the use of an objective lens with numerous field lenses.

FIGS. 9 and 10 illustrate angular distributions of the light beam (which are obtained by simulation) in the two angular directions φ 70 and φ 71 on the imager 34 according to the invention, the distributions being represented in a way that it is spatially limited by the footprint of the beam on the imager 34. In FIG. 9 (or 10) the distribution is represented with an aperture of 3.5 in all directions (or of 3.5 in the direction φ and 4.5 in the direction φ). It can be seen that there is no dark spot at the centre. The etendue of illumination is thus optimized.

With an optical element 33 of aperture 4.5 in one direction and 3.5 in the other direction the contrast is enhanced, an elliptical iris diaphragm allowing higher diffraction orders to be cut out.

Thus, the invention is compatible with apertures of the optical element 33 ranging between 3.5 and 4.5 (inclusive). The corresponding objective lens 21 therefore does not necessarily contain a field lens and is therefore less expensive than an objective lens compatible with the system of FIG. 1.

Furthermore, with the optical element 33, there are minimal disruptions in the directions of propagation and it is possible to dispense with an optical element (such as a field lens or TIR prism (when the imager is of the transmissive LCD type) splitting the illuminating and imaging beams.

Figure 11:
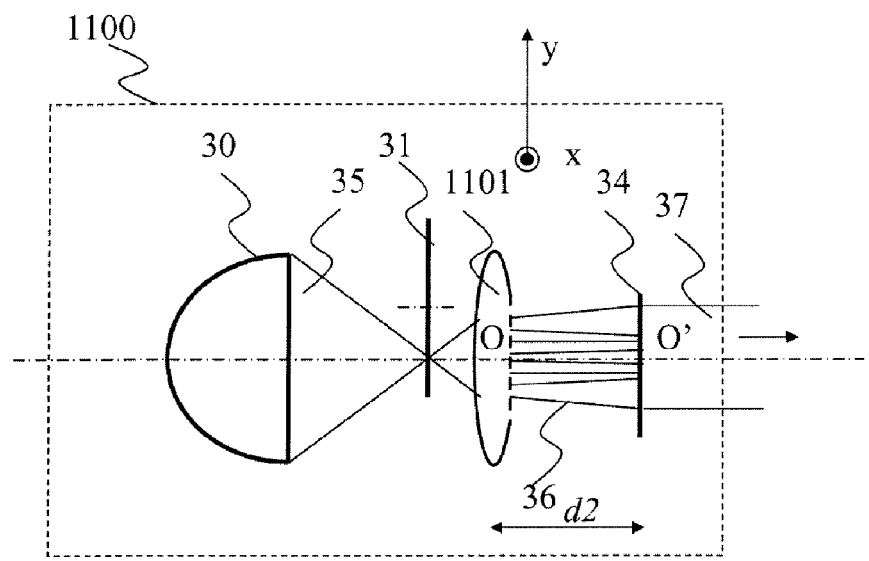

FIGS. 11 and 12 illustrate an illumination system 1100 and 1200 respectively, comprising an optical element 1101 and 1201 respectively, with a surface that collimates an incident beam and a second face comprising facets similar respectively to the faceted surface of the elements 33 and 41 described earlier. The systems 1100 and 1200 advantageously replace the system 20 in the projector 2, their bulk being smaller and their embodiment simpler (fewer components).

More specifically, the systems 1100 and 1200 comprise elements similar to the systems 20 and 40 which will not be described further (particularly the projection lamp 30 and the colour wheel 31).

Figure 13:
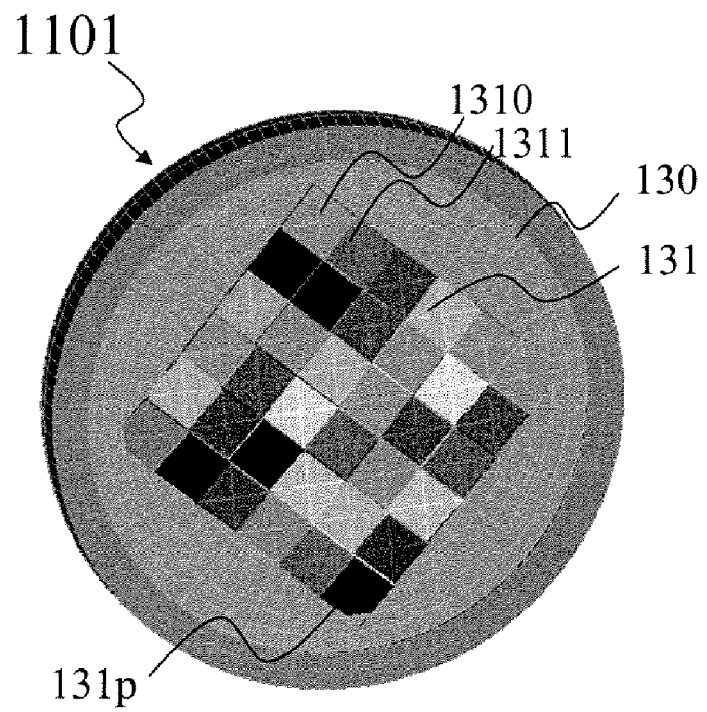
Figure 14:
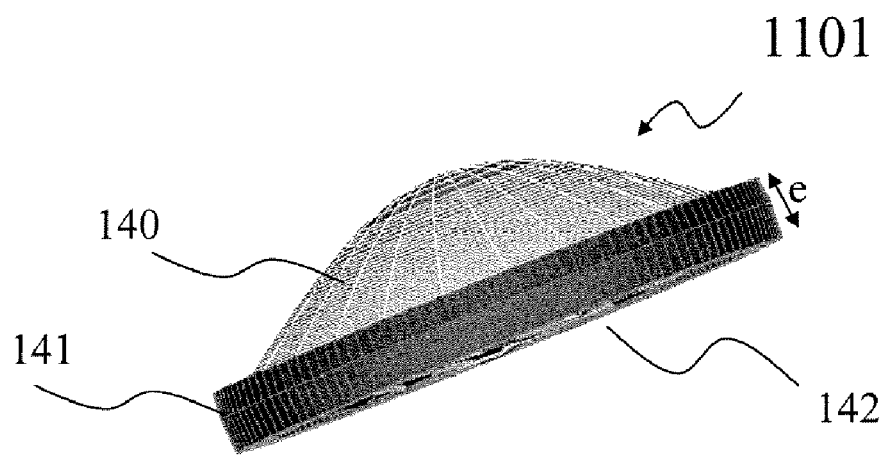

The system 1100 (or 1200) comprises the optical element 1101 (or 1201) including a first surface 142 and an opposite, second, surface 140 as illustrated with reference to FIGS. 13 (front view) and 14 (side view).

The first surface 142 comprises a region 130 surrounding a rectangular region 131 and comprising juxtaposed and square facets 1310 to 131p. The second surface 140 collimates the illuminating beam 35 to produce a more or less collimated beam propagating within the optical element 1101 as far as the first surface 131. The second surface 140 is spherical or aspherical (for example having the form of a conical lens).

The facets of the first surface 131 are each designed to redirect part of the illuminating beam 35 towards the imager 34 so as to illuminate the imager 34 in a more or less uniform way, in a similar way to the way the facets of the previously illustrated element 33 were calculated.

According to a variant of the invention, the region 131 comprising the facets has a non-rectangular shape and is, for example, exactly circular (with the edge facets truncated) or more or less circular (with, for example, identical facets over its entire surface area).

According to a variant of the invention, the region 131 occupies the entirety of the first surface 142.

It will be noted that the element 1101 is relatively small in size, the thickness e of the edge face 142 being small (the element 1101 is thin) and preferably ranging between 3 and 5 mm.

The element 1201 is similar to the element 1101 except for its facets which are calculated according to the imager 43 taking account of the distance separating the imager 43 from the element 1201 (this distance preferably being chosen as the minimum distance that allows the imaging beam 45 not to intersect the optical element 1201) and of the inclination of the imager 43 with respect to the optical beams 42 originating from the element 1201.

FIGS. 15 and 16 illustrate the illumination by incident light beams 42 on the imager 43 respectively without and with limitation of the footprint of the beam 42 on the imager 43. The lightest points represent maximum illumination.

Thus, it can be seen that the illumination of the imager 43 is more or less uniform and that most of the beams illuminate the imager 43, thus demonstrating the high efficiency with which the imager is illuminated.

Furthermore, the qualities of the illumination systems 1100 and 1200 are similar to the qualities of the illuminations systems 20 and 40.

FIG. 17 shows the angular distribution of the incident light beams 42 on the imager 43 with an aperture of 4.

The illuminations and angular distributions presented in relation to FIGS. 15 to 17 correspond to the use of an imager of the DMD type but are also valid for other types of imager (particularly transmissive LCD and LCOS imagers). It can be seen that the invention allows the use of an aperture that is smaller than in the techniques of the prior art (for example an aperture of 4 rather than 2.5, keeping the same flux).

Figure 18:
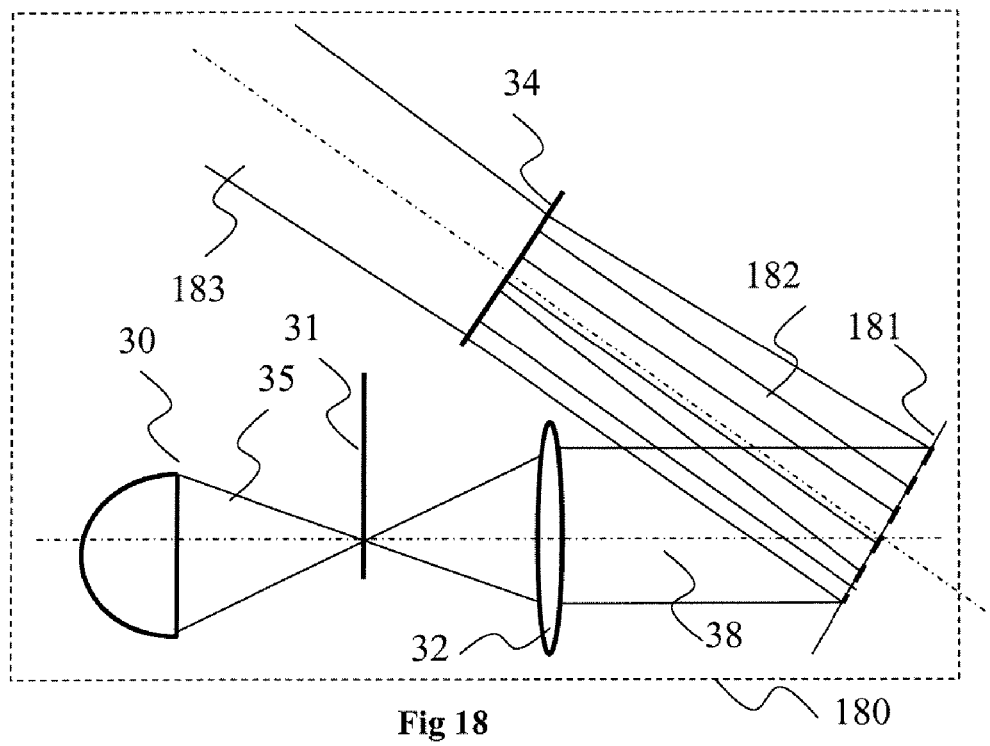

FIG. 18 shows a projector 180 employing a faceted optical element 181, each of the facets reflecting an incident beam 38 towards an imager 34, the optical element 181 being illuminated by a more or less collimated beam 38.

More specifically, the projector 180 comprises elements similar to the elements of the projector 20, particularly a projection lamp source 30, a colour wheel 31, a lens 32 and the imager 34, which bear the same references and are not described further.

Each of the facets of the element 181 is preferably plane and makes a defined angle with the optical axis of the incident beam 38 so as to redirect part of the illuminating beam towards the imager 34. According to a variant of the invention, the facets are not plane but slightly curved but for the purpose of calculating their orientation can be likened to plane surfaces.

The scenario whereby the faceted optical element 33 is refractive can be read across to the scenario whereby it is reflective (element 181) particularly for variants in which a reflective mode may apply, and for calculating the facets.

Thus, according to a computerized method for calculating the facets, a great many (typically 10 000) possible illumination systems are preferably defined using the following algorithm and the best one is chosen: for each facet, a point of impact on the imager of an average ray passing through the centre of the facet is defined at random; the orientation s of each facet of the element 181 is then calculated and all the rays passing through this facet are plotted. Next, the illuminations are summed and the merit function calculated, using for example one of the merit functions set out above. The systems can be ranked in decreasing order of merit value, the best being adopted (that is to say those associated with the highest M value obtained); a high merit value ensures good uniformity, high flux and an appropriate aperture number.

The facets of the optical element 181 are preferably square or rectangular. According to various variants of the invention, they may be of any form, identical or otherwise. As a preference, the facets are juxtaposed to avoid unwanted exit beams. In particular, according to various variants of the invention, the facets are juxtaposed with hexagonal or triangular shapes.

The imager 34 illustrated with reference to FIG. 18 is of the transmissive LCD type. According to variant embodiments of the projector 180 with a faceted optical element 181 associated with a lens 32, it is of the DMD or LCOS type.

Figure 19:
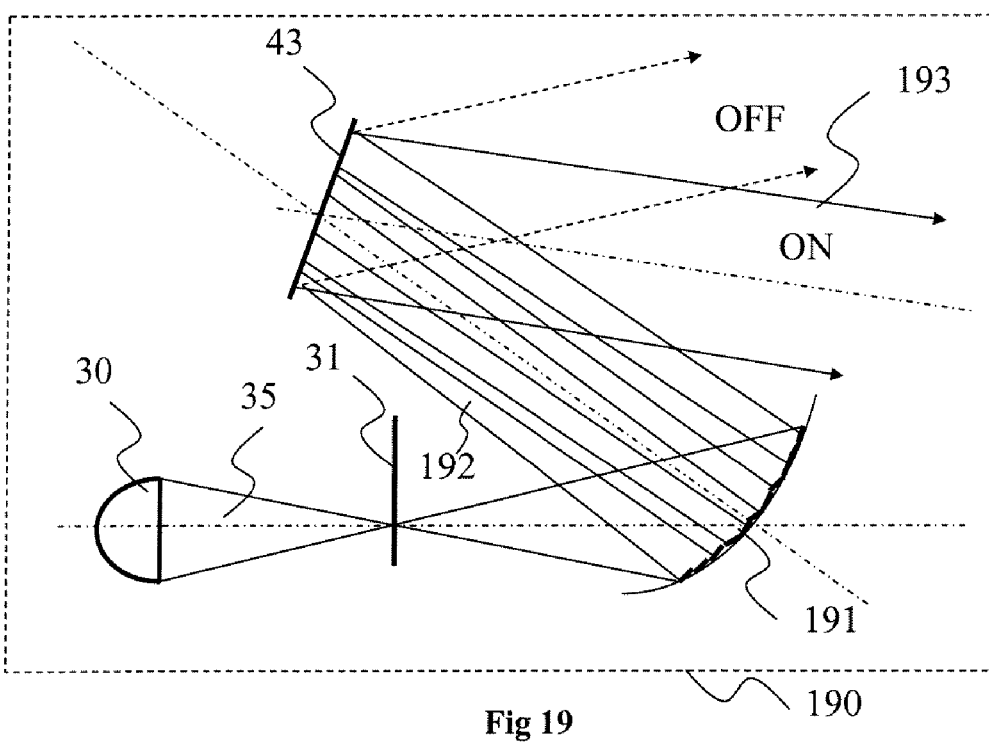

FIG. 19 shows a projector 190 implementing a faceted optical element 191, each of the facets reflecting an incident beam 35 towards an imager 43, the optical element 191 being illuminated by a beam 35 originating from a focusing point situated on a colour wheel 31.

More specifically, the projector 190 comprises elements similar to the elements of the projector 1200, particularly a projection lamp source 30, a colour wheel 31 and the imager 43, which bear the same references and are not described further.

Each of the facets of the element 191 is plane and makes a given angle with the optical axis of the incident beam 35 so as to redirect part of the illuminating beam towards the imager 43.

The facets of the element 191 are calculated in a similar way to the facets of the element 181, taking account of the fact that, at a given point on each facet of the element 191, the incident beam originates from a point (the angle of incidence is not the same for all the facets of the element 191). The facets of the element 191 are also calculated in such a way as to more or less collimate the illuminating beam (that is to say in such a way that the beam reflected by all of the facets forms a beam which diverges from its optical axis by less than 6° in absolute terms).

The imager 43 illustrated with reference to FIG. 19 is of the reflective DMD type. According to variant embodiments of the projector 190 with faceted optical element 191 and no separate collimation lens, it is of the transmissive LCD or LCOS type.

According to a preferred variant of the invention, the faceted surface of the optical elements 33, 41, 1101, 1201, 181 and 191 is partially or completely replaced by one or more continuous and preferably ridgeless surfaces, the shape of the corresponding optical element being calculated in such a way as to redirect at least part of the illuminating beam towards the imager. The beam thus reorientated by the optical element has an overall shape adapted to suit the imager (for example DMD, LCOS or transmissive LCD) and advantageously allows the illuminating beam to be made homogeneous on the imager and allows the illuminating flux to be optimized. The fact that the useful surface area of the optical element redirecting the illuminating beam completely or partially comprises one or more continuous surfaces in particular makes manufacturing the optical element easier. That also makes it possible to obtain pupil illumination that is better structured and therefore more easy to render homogeneous. FIGS. 26 to 32 illustrate optical components according to this preferred variant of the invention and FIGS. 20 to 25 illustrate an illumination system employing such components and corresponding to the system 20 of the back-projector 2 illustrated in FIG. 2.

Figure 20:
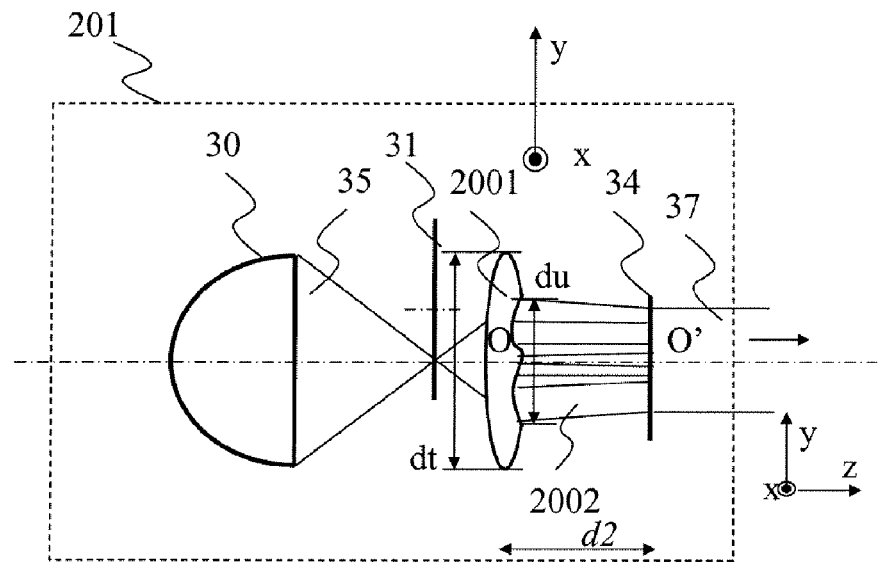

FIG. 20 (and FIGS. 21 to 25 respectively) shows an illumination system similar to the illumination system of FIG. 11 (and FIGS. 12, 18, 19, 3 and 4 respectively) except for the optical element that redirects the illuminating beam towards the imager in order to illuminate it more or less uniformly. The common elements already described with reference to FIGS. 3, 4, 12, 18 and 19 will not therefore be detailed further.

More specifically, FIG. 20 illustrates an illumination system 201 similar to the system 1100 and comprises an optical element 2001 in place of the element 1101. The system 201 is particularly simple (few components) and not very bulky.

The optical element 2001 comprises an inlet surface which collimates the incident illuminating beam and an exit surface the shape of which is such as to modify the cross section of the illuminating beam so that the beam has a cross section more or less adapted to suit that of the imager (in the plane of the imager, the cross section of the beam is more or less rectangular and the beam illuminates the imager more or less homogeneously).

Figure 26:
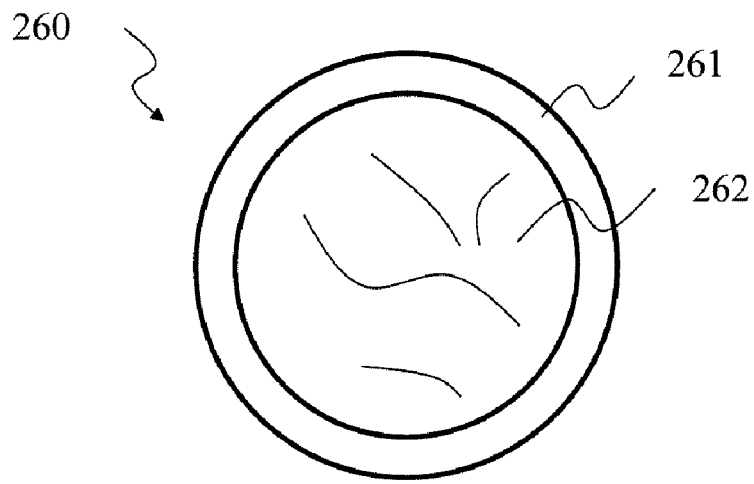

The optical element 2001 corresponds, for example, to an optical element 260 as illustrated with reference to FIGS. 26 (front view) and 30 (side view). On its exit face (on the imager side) it comprises a useful surface 262 and some arbitrary peripheral surface 261 of diameter dt.

The useful surface 262 is a continuous ridgeless surface (the equation of this surface can be derived) to make it easier to manufacture (for example by casting). It is circular with a diameter du equal, for example, to 25 mm. This diameter is tailored to the size of the imager and is preferably smaller than 40 mm and more preferably still smaller than 30 mm. Thus, for a circular useful surface 262, the area of the surface 262 is preferably less than 12.6 cm² and more preferably still, less than 7.1 cm². The diameter dt is, for example, equal to du+2 or 5 mm. In general, dt does not exceed du by more than 5 mm, this being so as to limit the size of the optical element.

The shape of the surface 262 is calculated so that the illuminating beam illuminates the imager more or less homogeneously, at the same time limiting flux losses. It is not therefore an everyday shape (for example planar, spherical or elliptical) but on the contrary has a special shape which specifically modifies the cross section of the illuminating beam (typically circular or elliptical) turning it into a cross section of the shape of the imager (typically rectangular).

By way of example, with a 0.56" imager, the shape of the surface 262 is described according to the following polynomial:

$$z(x, y) = -4.239646304650 \times 10^{-2} x^2 - 3.326380966712 \times 10^{-2} y^2 -$$
$$1.966671669322 \times 10^{-5} x^4 - 6.198237634196 \times 10^{-5} x^2 y^2 -$$
$$6.426453423140 \times 10^{-6} y^4 + 2.266408826592 \times 10^{-7} x^6 +$$
$$2.855371168045 \times 10^{-7} x^4 y^2 - 1.055433102635 \times 10^{-7} x^2 y^4 -$$
$$2.548116290879 \times 10^{-7} y^6 - 1.548363766813 \times 10^{-9} x^8 -$$
$$1.043474004569 \times 10^{-9} x^6 y^2 + 7.842149369509 \times 10^{-9} x^4 y^4 -$$
$$8.156691681376 \times 10^{-9} x^2 y^6 + 5.430240779746 \times 10^{-10} y^8 -$$
$$1.046483939550 \times 10^{-12} x^{10} - 6.225724849459 \times 10^{-13} x^8 y^2 -$$
$$4.903772428275 \times 10^{-13} x^6 y^4 - 2.052417294871 \times 10^{-12} x^4 y^6 -$$
$$1.305693189623 \times 10^{-12} x^2 y^8 - 8.508867125822 \times 10^{-13} y^{10}.$$

With this shape of surface 262, the distance between the imager and the centre of the surface (on the imager side) is 80 mm. Furthermore, in order for the illuminated region to truly coincide with the imager, the surface 262 is rotated by 15° in the direction from the axis y towards the axis x.

With a 0.56" imager and a lamp with an arc size of 1 mm, the optical element 2001 thus defined allows the imager to be illuminated with 40.4% of the flux emitted by the source, a uniformity of 39.8, the illuminating beam leaving the optical element 2001 having an aperture of 3.85.

The surface 262 (and, more generally, all the surfaces of the optical element or system according to the invention, particularly the surfaces defined with reference to FIGS. 20 to 32) can be optimized by iterative computerized calculation, a surface being defined upon each iteration step and a corresponding merit function being calculated. As indicated above, the system performance is defined by three parameters: $\phi$ (optical power or flux on the imager 34), f (the aperture number (or numerical aperture) of the beams 36 and 37) and u (uniformity of illumination on the imager 34 corresponding to the ratio of the minimum illumination to the maximum illumination). In a way similar to that which was described earlier for defining a faceted optical element, the merit function is, for example, in the form $M = \phi(u-v)^p f^r$, where p and r represent integers (for example 1, 2 or 3) or fractions (for example ½) and can be chosen as weighting parameters for weighting the uniformity and the flux respectively. In general, the merit function is a function of $\phi$, u and f, with greater or less weighting with respect to $\phi$, u and f according to the parameter or parameters to be favoured (possibly taking account of minimum or maximum limits on one or more parameters). These three values are thus preferably optimized simultaneously by deforming the surface in a targeted manner. First of all, a first surface is defined in the form of an equation, for example a polynomial, trigonometric, or spline equation or a combination of polynomial equations, trigonometric equations and splines. Next, the corresponding merit function is calculated and the merit function and the first surface are then saved as being a surface of optimized merit function. The iterative calculation process is then begun. Upon each step of the iteration, a deformation and a surface equation (the surface being known as the current surface) are defined by altering the parameters of the surface equation (for example the coefficients in the polynomial or trigonometric equation, the values of the phases or pulses in trigonometric equations), 100 000 rays corresponding to the current surface are plotted, then the corresponding merit function is calculated and compared with that of the best system corresponding to a surface termed the surface of optimized merit function, determined previously. If the merit function is higher, then the current surface becomes the surface of optimized merit function and its equation and merit function are saved. Calculation stops, for example, when a minimum merit function value has been achieved (that is to say, for example, when the merit function is above or equal to a predetermined threshold value or when it increases no further after a predetermined number of iterations) and/or when a minimum number of iteration steps have been performed.

Figure 27:
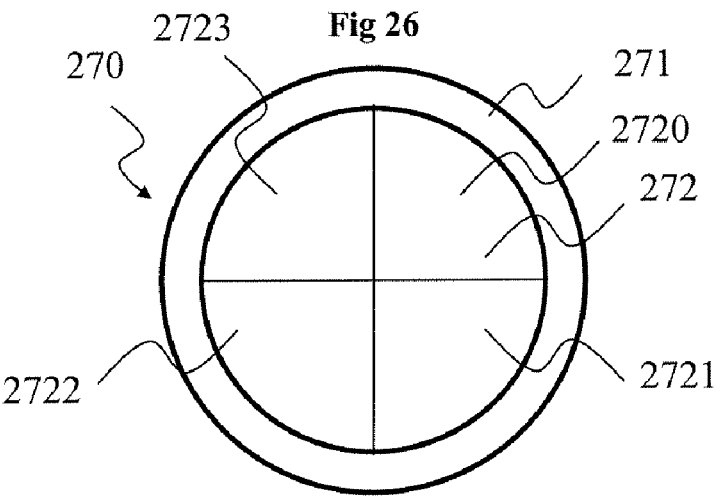

According to a variant embodiment, the optical element 2001 corresponds, for example, to an optical element 270 as illustrated with reference to FIG. 27 viewed from the front. On its exit face, the element 270 comprises a useful surface 272 and a peripheral surface 271 similar to the surface 261.

The useful surface 272 comprises four continuous juxtaposed elementary surfaces 2720 to 2723, each ridgeless. The surface 272 is circular of diameter du, its periphery being similar to the periphery of the surface 262.

The shape of the surface 272 is calculated so that the illuminating beam illuminates the imager more or less homogeneously while at the same time limiting flux losses. The elementary surfaces 2720 to 2723 may be more or less associated with part of the imager (each of the surfaces producing an illuminating beam illuminating, more or less homogeneously, the part of the imager that corresponds to it) or, on the other hand, the elementary surfaces 2720 to 2723 are not associated with any particular region of the imager and it is the illuminating flux on the whole that homogeneously illuminates the imager. The elementary surfaces 2720 to 2723 may be similar (which makes it possible to reduce the amount of calculation needed in order to define them) or dissimilar. According to the invention, the useful surface may comprise a number of continuous ridgeless elementary surfaces that is not necessarily equal to four but may just as well be two, three, six, eight, etc and more generally any number of values. As a preference, although not necessarily, the join between two adjacent elementary surfaces is itself continuous and has no sudden discontinuity.

Likewise, the boundaries between the elementary surfaces are not necessarily straight. Thus, as illustrated with reference to FIG. 32 in a side view, according to a variant embodiment, the optical element 2001 corresponds, for example, to an optical element 320. The optical element 320 comprises an entry surface 3203 that performs a function of collimating the illuminating beam and a peripheral surface 3201 that is of no optical usefulness. On its exit face, the element 320 comprises a useful surface (which has a diameter du as specified earlier) which itself comprises two concentric and continuous elementary surfaces 3204 and 3202. The central surface 3204 is concave and spherical; it creates a beam that illuminates the imager non-homogeneously. The surface 3202 surrounding it has a shape able to correct for this lack of homogeneity of the illumination of the imager. The surface 3202 may or may not have ridges.

Figures 28, 29:
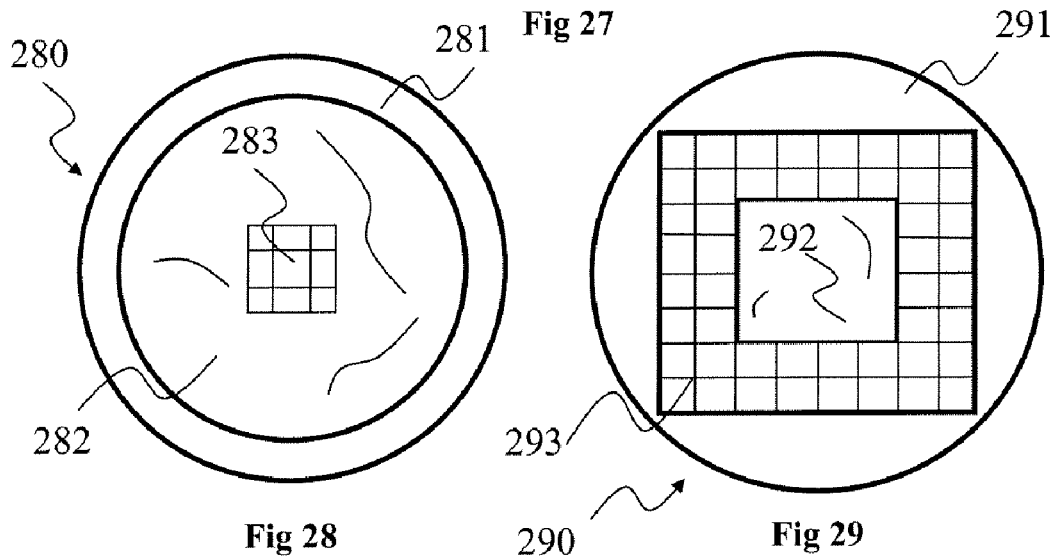
Figure 30:
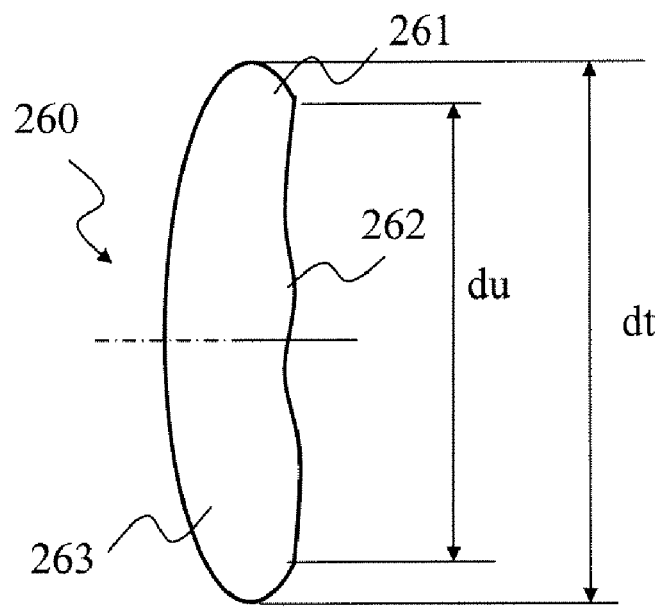
Figure 31:
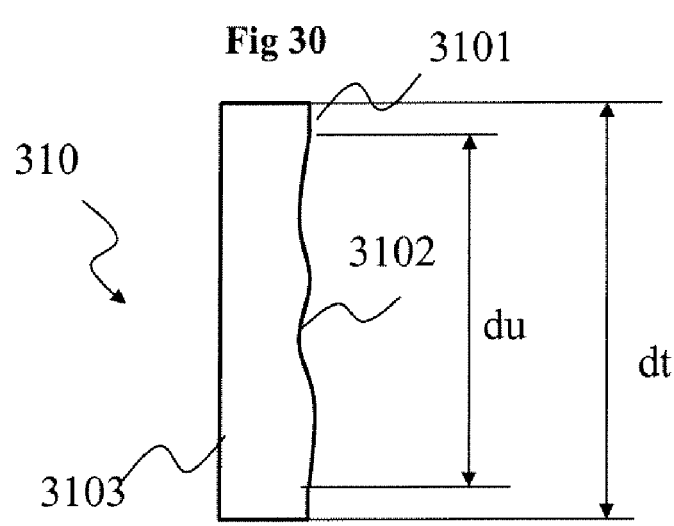
Figure 32:
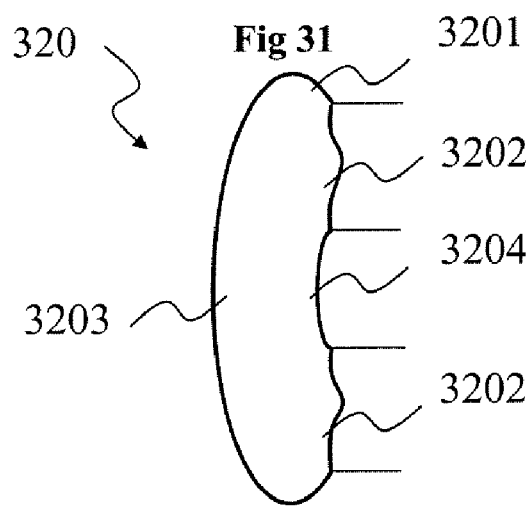

According to a variant embodiment, the optical element 2001 corresponds, for example, to optical elements 280 or 290 as illustrated with reference to FIGS. 28 and 29 respectively, which are front views.

On its exit face the element 280 (or 290) comprises a useful surface (or 292) and a peripheral surface 271 (or 291) similar to the surface 261.

The useful surface of the element 280 is circular and with a diameter equal to du. It comprises a central faceted region 283 and a continuous region 282 (with or without ridges) surrounding it. The region 283 is preferably square (it is easier to implement a square faceted region, making it possible to have facets that are square and of identical shape).

The useful surface of the element 290 is square with a side length of du, preferably shorter than or equal to 4 mm (the area of the square useful surface is therefore preferably less than or equal to 16 mm$^2$). It comprises a central region 292 with a continuous surface and a peripheral and faceted region 293.

The regions 282 and 283 (or 292 and 293) may be more or less associated with part of the imager (each of the regions producing an illuminating beam more or less homogeneously illuminating the part of the imager that corresponds to it) or, on the other hand, they are not associated with a particular region of the imager and it is the illuminating flux on the whole that homogeneously illuminates the imager. One of the regions may be calculated simply and may illuminate the imager non-homogeneously. The complementary region of the useful surface has a shape defined in such a way as to correct for this lack of homogeneity of illumination of the imager. In particular, if the complementary region corresponds to a faceted region, its surface may be calculated in a similar way to the way in which the faceted surface as illustrated with reference to FIG. 5 is calculated.

Of course, other variants of the optical element employing at least one faceted region and at least one continuous region are conceivable according to the invention. According to the invention, the person skilled in the art may in particular consider more than one faceted region and/or more than one region corresponding to a continuous non-plane surface. He may also consider perimeters of regions not necessarily square or circular (for example triangular, hexagonal, regular or otherwise).

Figure 21:
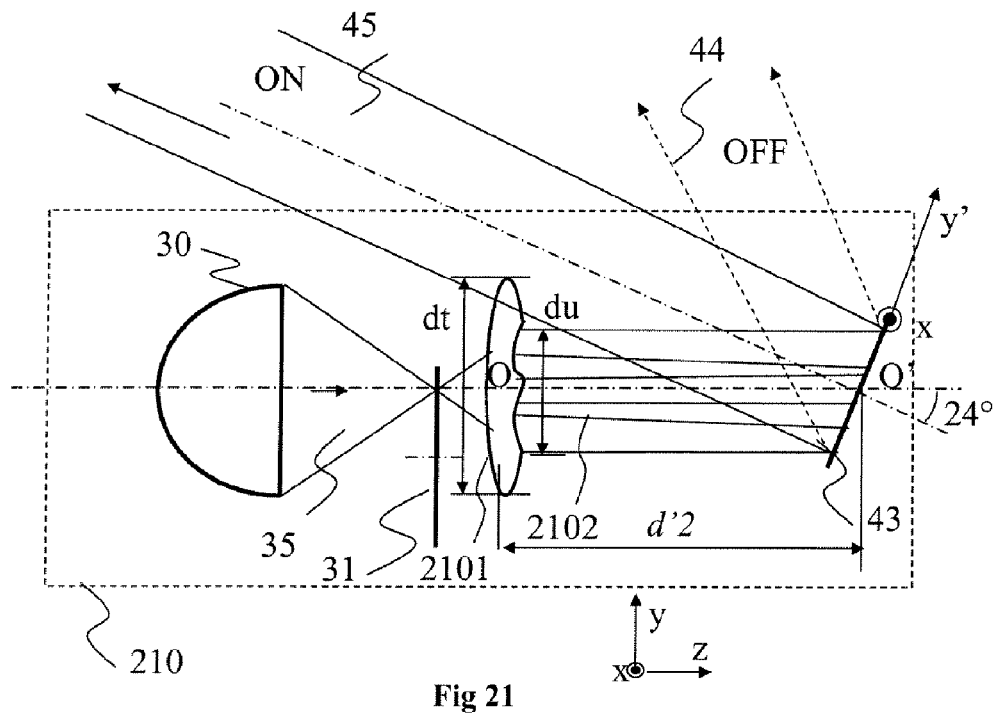

FIG. 21 illustrates an illumination system 201 similar to the system 1200 and comprises an optical element 2101 in place of the element 1201. The system 201 is particularly simple (few components) and not very bulky.

According to the invention, the optical element 2101 is similar to the element 2001 except for the shape of its useful surface redirecting the illuminating beam that illuminates the imager 43 which is inclined with respect to the axis of the illuminating beam 2102 illuminating it. In particular, the optical element 2101 has an overall structure (entry surface, peripheral surface and type of useful surface) that corresponds to the optical elements compatible with the general structures of the elements described with reference to FIGS. 26 to 30 and 32. This structure will therefore not be detailed further.

Figure 24:
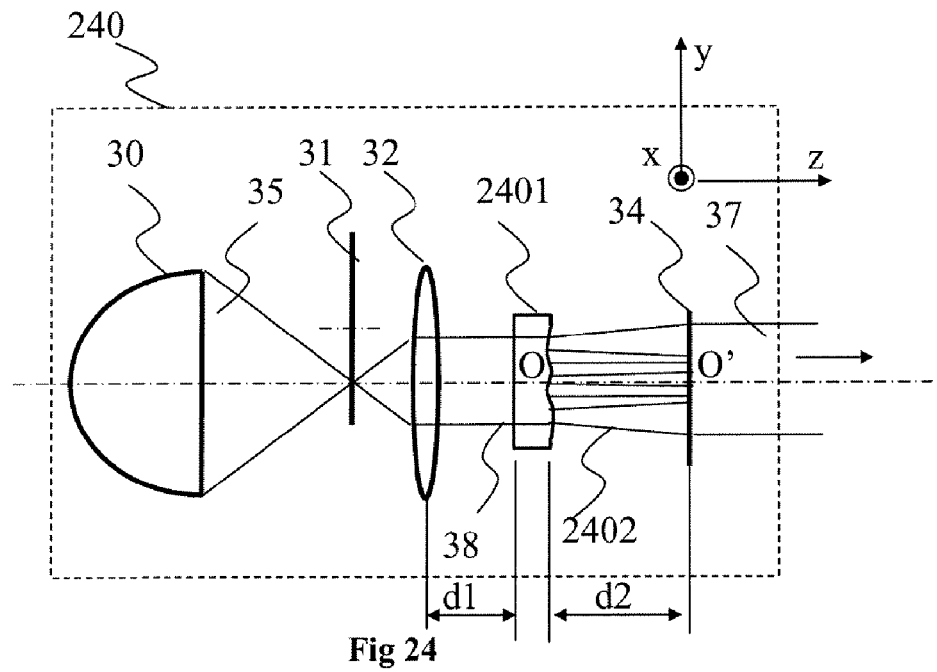
Figure 25:
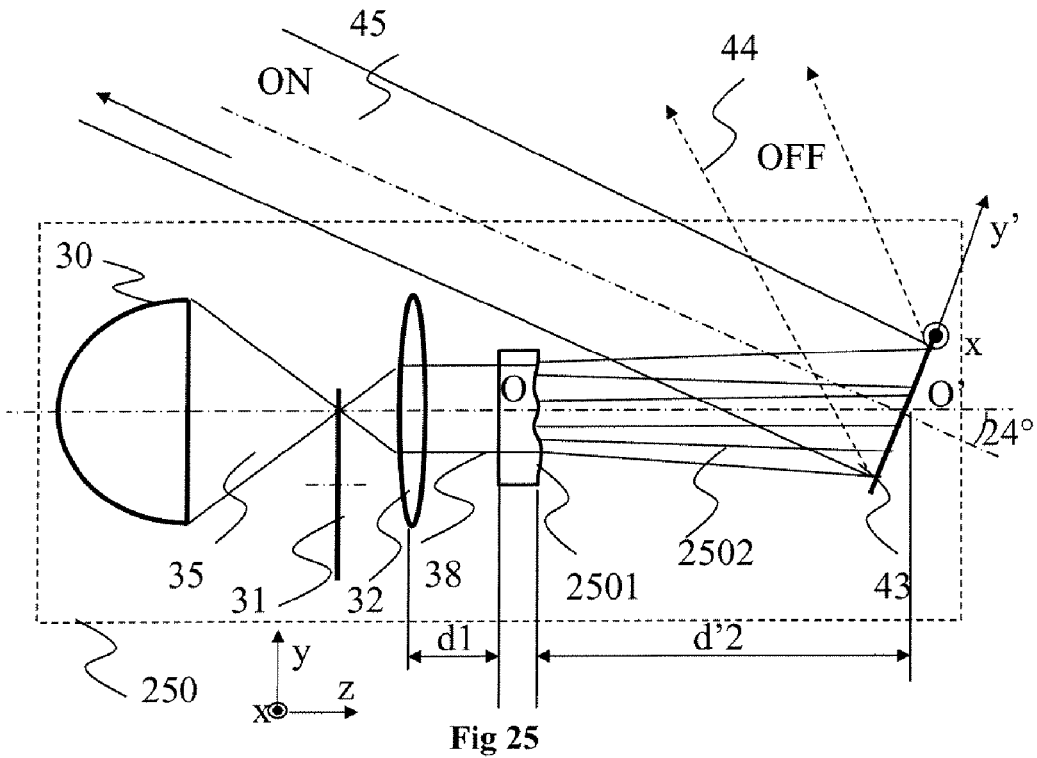

FIG. 24 (or 25) illustrates an illumination system 240 (or 250) similar to the systems 20 (or 40) and comprises an optical element 2401 (or 2501) in place of the element 38 (or 42) with a flat entry surface and a useful surface able to redirect the beam in such a way that the illumination of the imager is more or less homogeneous identical to the corresponding surface of the element 2001 (or 2101). In effect, the lens 32 performs the function of collimating the incident beam which function is performed by the entry face of the optical elements 2001 or 2101. The systems 240 and 250 will therefore not be described further.

Figure 22:
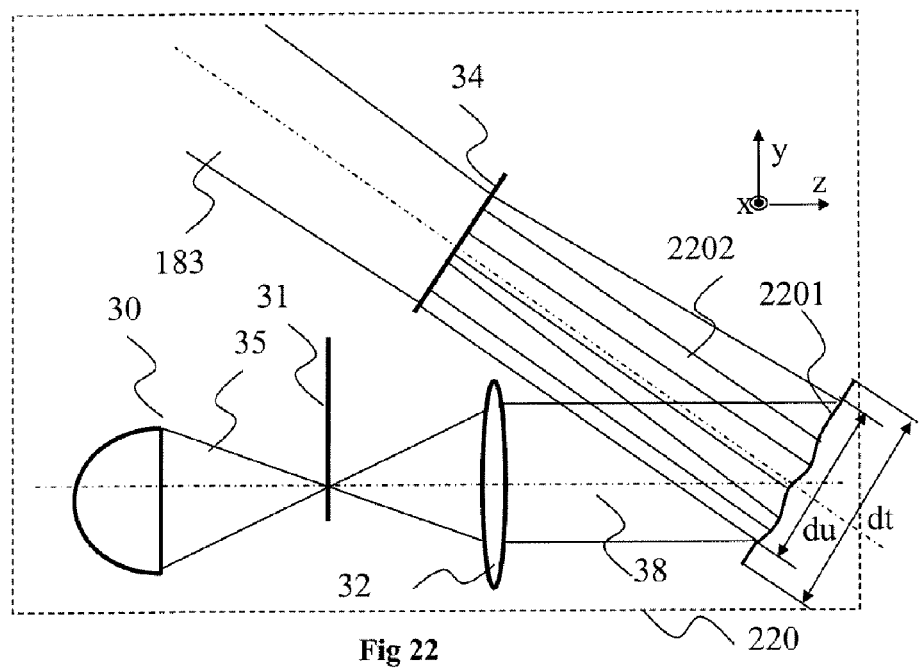
Figure 23:
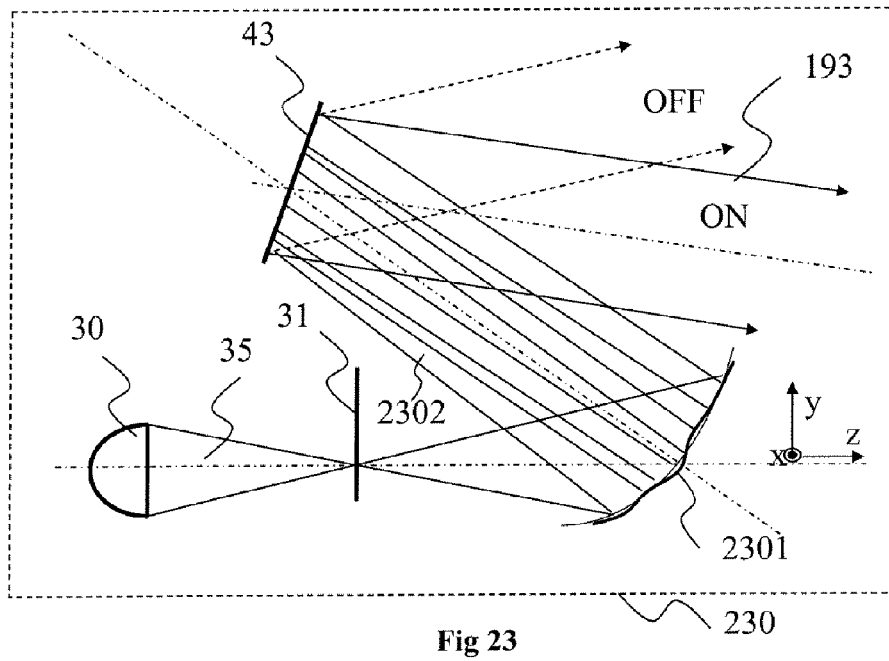

FIGS. 22 and 23 illustrate an illumination system 220 and 230 respectively, similar to the systems 180 and 190 respectively and comprising an optical element 2201 and 2301 respectively in place of the elements 181 or 191.

The optical elements 2201 and 2301 comprise a reflective useful surface the shape of which allows the cross section of the illuminating beam to be modified so that the beam has a cross section more or less tailored to suit that of the imager (in the plane of the imager, the cross section of the beam is more or less rectangular and the beam illuminates the imager more or less homogeneously). The reflective surface of the optical element 2301 also collimates the incident illuminating beam.

The useful surface is a continuous ridgeless surface to make it easier to manufacture. It is, for example, circular of diameter du as described above.

According to various variants, the reflective useful surface comprises one or more continuous ridgeless surfaces (like the element 270). According to other variants of the invention, the reflective useful surface further comprises one or more faceted regions (like the elements 280 and 290). The person skilled in the art will be able to adapt the variants of the transmissive elements which are illustrated with reference to FIGS. 20, 21 and 25 to 32 to suit within the context of the reflective useful surfaces of the systems 240 and 250. These variants of the invention will therefore not be described further.

Of course, the invention is not restricted to the embodiments described hereinabove.

In particular, the invention is compatible with use of any imager or with a system involving several imagers comprising, for example, an optical element with facets and/or with one or more continuous surfaces the shape of which is designed to illuminate several images homogeneously.

The invention is also compatible with the use of several illumination sources illuminating an optical element with facets and/or with one or more continuous surfaces the shape of which is designed to illuminate at least one imager homogeneously.

Furthermore, the invention is advantageously employed in projectors of the front projection or back-projection type.

The invention employing a refractive optical element is also compatible with transparent refractive optical elements made of any material (for example glass, birefringent materials (quartz, calcite, sapphire, etc) or plastic).

The source of illumination may also be any arbitrary source (arc lamp, etc) and may be associated with optical elements also of any arbitrary kind that make it possible to obtain a more or less collimated illuminating beam on the useful surface (faceted and/or continuous).

The person skilled in the art will also be able to adapt the invention with systems implementing additional optical elements, particularly field lenses, mirrors, optical filters, etc.

The use of the optical element with facets and/or with continuous surface(s) is not restricted to use of the facets and/or of the continuous surface or surfaces on a first surface, the second surface being neutral or having a simple lens function, but also encompasses optical elements in which a first surface comprises facets and/or continuous surface or surfaces to redirect an illuminating beam in order to tailor it to the shape of the imager, the second surface being of the Fresnel lens type or itself having facets.

Nor is the invention restricted to cases where the optical element comprises, on a first surface, means for redirecting part of the illuminating beam towards an imager, so as to illuminate the imager and adapt the shape of the beam to suit the imager, these means being of the reflective or refractive facets type (which may or may not be associated with continuous surfaces). Indeed, the facets may be replaced by continuous surfaces forming, for example, strips (elongate surfaces bounded along their length by two opposite ridges) that are not plane, each of the strips of the reflective or refractive type redirecting, independently of one another, part of the illuminating beam towards the imager so as to illuminate it, all of these strips together adapting the shape of the beam to suit the imager.

The invention is also compatible with use of an optical element comprising, on one of its surfaces, both facets and strips.

Furthermore, according to the invention, the facets of the optical element are not necessarily planar but may be slightly curved.

The invention claimed is:

1. Optical system comprising:
    at least one source of illumination designed to produce an illuminating beam focused on a focusing zone;
    at least one imager able to produce an imaging beam when illuminated by the said illuminating beam;
    collimating means for collimating the said illuminating beam originating from the said focusing zone;
    at least one optical element comprising a plurality of adjacent plane facets on a first surface of the at least one optical element, each of the adjacent plane facets being able to redirect part of the said illuminating beam after collimation towards the said imager, thereby forming a redirected beam for illuminating the said imager, the redirected beams associated with all of the plane facets having an overall shape adapted to suit the said imager.

2. System according to claim 1, characterized in that the said collimating means collimate the said illuminating beam in such a way that the said optical beam diverges from its optical axis by a value of less than 6° in absolute terms.

3. System according to claim 1, characterized in that the said first surface refracts the said illuminating beam.

4. System according to claim 3, characterized in that the said optical element comprises a second surface, opposite to the said first surface, the said second surface at least partially forming the said collimating means.

5. System according to claim 4, characterized in that the said second surface is spherical or aspherical.

6. System according to claim 1, characterized in that the said first surface reflects the said illuminating beam.

7. System according to claim 1, characterized in that the said first surface converts the said illuminating beam into a beam of more or less rectangular cross section, the said imager being rectangular.

8. System according to claim 1, characterized in that the area of the said first surface is less than or equal to 16 cm$^2$.

9. System according to claim 1, characterized in that the aperture of the illuminating beam leaving the said optical element is between 3.2 and 5.

10. System according to claim 1, characterized in that the said optical element is configured and positioned in such a way that at least 95% of the illuminating flux illuminating the said optical element reemerges via the said first surface.

11. System according to claim 1, characterized in that it comprises a colour wheel (31) and means for focusing the said illuminating beam on the said colour wheel in the said focusing zone, the said collimating means having, as their focal point, a point lying within the said focusing zone.

12. System according to claim 1, characterized in that it comprises a projection lens for projecting the said imaging beam.

13. System according to claim 12, characterized in that it comprises means for folding the said imaging beam and a back-projection screen.

* * * * *